H. B. HARTMAN.
ELECTRICAL SNAP SWITCH FOR WATER PURIFYING APPARATUS.
APPLICATION FILED NOV. 8, 1915.
1,255,531.
Patented Feb. 5, 1918.
3 SHEETS—SHEET 3.
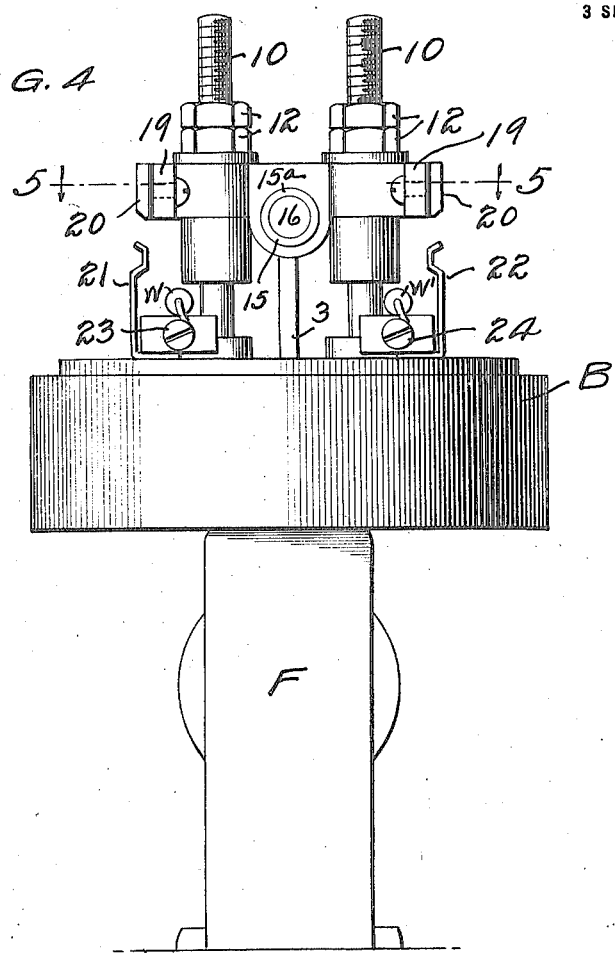
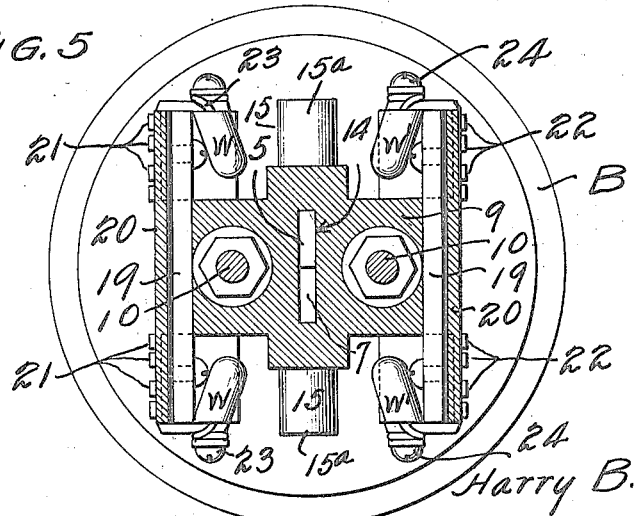

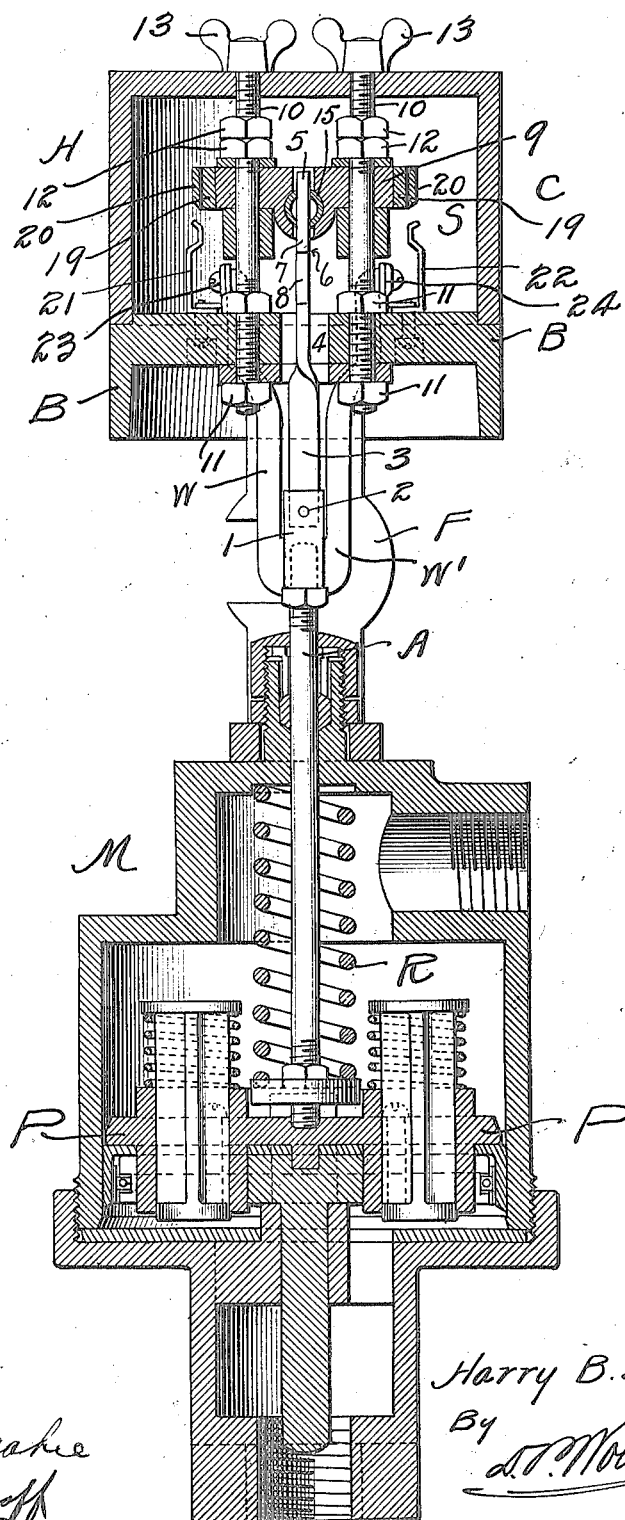

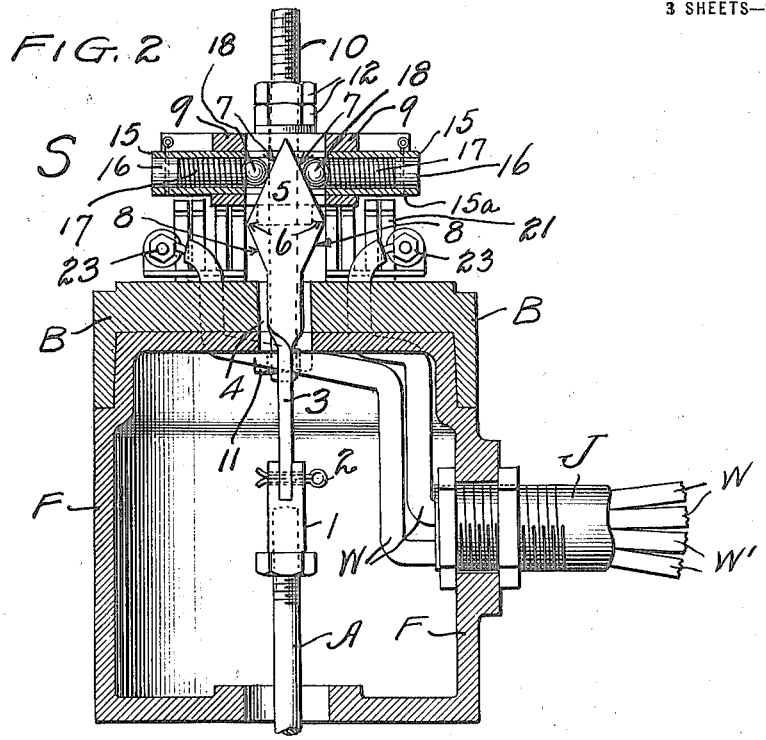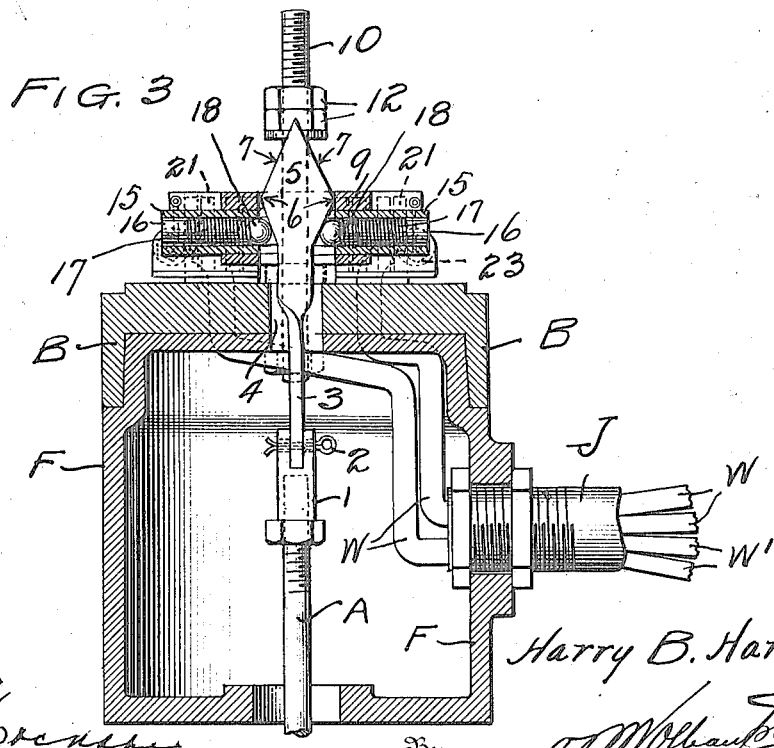

UNITED STATES PATENT OFFICE.

HARRY BUXTON HARTMAN, OF SCOTTDALE, PENNSYLVANIA, ASSIGNOR TO ELECTRIC WATER STERILIZER COMPANY, OF SCOTTDALE, PENNSYLVANIA, A CORPORATION OF PENNSYLVANIA.

ELECTRICAL SNAP-SWITCH FOR WATER-PURIFYING APPARATUS.

1,255,531.  Specification of Letters Patent.  Patented Feb. 5, 1918.

Application filed November 8, 1915. Serial No. 60,345.

*To all whom it may concern:*

Be it known that I, HARRY B. HARTMAN, a citizen of the United States, residing at Scottdale, in the county of Westmoreland and State of Pennsylvania, have invented certain new and useful Improvements in Electrical Snap-Switches for Water-Purifying Apparatus, of which the following is a specification.

This invention relates to electric switches, and more particularly to snap switches of an automatic type that are especially adapted to be operated by a mechanical actuating element upon the recurrence of certain conditions.

Primarily, the present invention has in view a novel automatic switch controlled by a moving member having means whereby the switch element will be actuated to quickly make and break an electric circuit, or in other words snap quickly into an open or a closed position and thus prevent arcing or sparking, even though the means for actuating the switch is not capable of itself to directly effect such an action. That is to say, the present invention proposes to provide a novel and reliable automatic switch, which although susceptible of a wide range of practical uses, is of special utility in connection with water purifying apparatus wherein there is employed a flow responsive motor which has a plunger element that is responsive to the pressure differences caused by the cutting off of the flow of liquid through the apparatus.

Water purifying apparatus of this general type usually includes an electrode box, a coagulation chamber, and filter cylinder for filtered water, having a suitable draw-off connection. That is to say, the water flows through the electrode box and is treated by the electric current while passing therethrough, then flows to the coagulation chamber, and then to the filter beds in the filter cylinders. The final purification is done by mechanical filtration through the filter beds. Thus, the water is purified automatically and continuously while the water is flowing, by a continuous and instantaneous process. It is the control of this current in the electrode box that the present invention is particularly concerned with, and in this connection, it will be apparent that it is unnecessary to continuously maintain this current in the electrode box, because the bacteria and other impurities may be effectually eliminated during the flow of the water through the electrode box and filter beds of the filter cylinders. Accordingly, to obviate the inconvenience of making and breaking by hand the circuit passing through the electrode box, the present invention proposes to utilize an automatically operated switch device controlled by a flow responsive motor. This motor is preferably of the type set forth in my Patent No. 1,180,146, dated April 18, 1916, whereby when the motor is actuated by a drop in pressure in the draw-off pipe line the switch device will operate to quickly close the circuit and simultaneously start the electrolytic action in the electrode box. On the other hand, when the motor returns to its normal at rest position, the switch will be actuated to break the circuit, and thus cause the action in the electrode box to cease.

To this end, the invention contemplates a novel, practical, and substantial switch device of simple construction, which may be relied upon under all conditions of use to quickly make and break the electric circuit for the water purifying electrodes.

With the above and other objects in view which will more readily appear as the nature of the invention is better understood, the same consists in the novel construction, combination and arrangement of parts hereinafter more fully described, illustrated and claimed.

A preferred and practical embodiment of the present invention is illustrated in the accompanying drawings; in which—

Figure 1 is a vertical sectional view of my improved automatic switch, showing its connection with the power controlled actuating member, all of the parts thereof being shown in their normal position.

Fig. 2 is an enlarged detail sectional view of the switch device open.

Fig. 3 is a view similar to Fig. 2 showing the switch device in its closed position.

Fig. 4 is an enlarged detail elevation of the switch.

Fig. 5 is an enlarged horizontal sectional view on the line 5—5 of Fig. 4.

Similar reference characters designate corresponding parts throughout the several figures of the drawings.

In carrying out the present invention, it is proposed to associate the same with a suitable power controlled actuating element which is responsive to certain conditions to automatically operate the switch parts to open and close an electric circuit. In this connection, as has been previously indicated, it is preferred to utilize the present switching device, designated in its entirety as S, with a flow responsive motor designated as M, preferably of the type set forth in my pending application aforesaid.

This motor essentially includes a plunger element P which is moved within the motor casing, by a difference in pressures on the inlet and outlet sides thereof, which movement in one direction is assisted by a suitable resilient element R, to thus cause the reciprocation or vertical movement of the control stem A, one end of which extends to an exposed position outside of the motor casing, while the other end is suitably connected with the plunger. Thus, the stem A of the motor provides a moving power controlled member which is utilized to quickly and automatically operate the switch upon the fulfilment of certain pressure conditions incident to the operation of a water purifying system, with which the present invention is primarily intended to be used.

Referring to the novel features of construction of the present switching device, as shown in the accompanying drawings, it will be observed from Fig. 1 that the same includes a switch casing C, which comprises a switch base B, supported by a junction box frame F, and a closure cap or hood H, detachably fitted to the switch base B. The said junction box frame F is so located on the motor casing M, that the reciprocating control stem A of the motor works therein, and in connection with the said stem A, it will be observed that the same carries at its exposed end, an adjustable coupling sleeve 1 which detachably receives, by means of a cotter pin 2 or other convenient fastening, a switch operating arm 3 that extends upwardly into the switch casing C through an opening 4 in the switch base. The upper end of this switch operating arm 3 carries a switching cam 5, which is of substantially diamond shape or form, having the opposite cam points 6, and the oppositely inclined upper cam edges 7—7 and lower cam edges 8—8. From the foregoing, it will be apparent that the arm 3 is adjustably connected with the relatively fixed stem A by means of the coupling sleeve 1, whereby the same may be readily adjusted to suit various requirements of use and conditions distinctively peculiar to water purifying apparatus. That is to say, since the arm 3 is adjustable with relation to the stem A, the diamond shaped cam 5 may be moved or shifted with respect to the movable switch block 9 to advance or retard the snapping of the same into and out of engagement with the fixed contacts. For instance, if it is desired to close the switch instantaneously with the opening of a faucet in the draw-off pipe line, the switch arm 3 may be elevated on the stem A by adjusting the coupling member 1, thereby advancing the closing of the circuit with respect to the passage of water through the motor M. On the other hand, if it is desired to close the circuit later, the arm 3 may be lowered by screwing the coupling connection 1 farther on to the prime actuator or stem A. Accordingly, it will be apparent that the provision of the adjustable coupling member 1 between the switch arm 3 and the prime actuator or stem A provides for a wide range of adjustment which is essential to the opening and closing the water purifying circuit at the proper time, whereby the greatest efficiency of the current may be obtained.

With further reference to the switch arm 3, it will be observed that the same has a relatively free movement through the switch block 9, thereby providing for the full rise of the prime actuator or stem A of the motor, whereby the plunger of the latter may be raised to its maximum extent. Switches of this type heretofore known have a switching cam arm that is limited in its movement, and therefore, cannot be adapted to the requirements of the switch to be used in connection with water purifying apparatus.

The switching cam 5 is adapted to control a switch block 9 movable in the same axial plane as the cam and carried upon the guide rods 10 respectively located opposite each of the flat faces of the cam 5. These guide rods are preferably securely attached to the switch base B by the clamping nuts 11, and are provided at their upper ends with the nuts 12 for regulating the amount of play or movement of the switch block 9. In addition to carrying the adjusting nuts 12, the upper ends of these rods may be provided with the wing nuts 13 for clamping the cap member or hood of the casing to the switch base B, and thus inclosing or housing all the switching mechanism within a switching chamber to protect the same from dust or foreign matter, and at the same time comply with safety requirements. Although the apparatus described is shown in a vertical or upright position, it will of course be understood that it may assume other positions, such as horizontal or even inverted.

Referring further to the movable switch block 9, which is in the form of a reciprocating cross head, it will be observed that the same is provided with a central slot 14 to accommodate the reciprocating switching cam 5, and is also provided at each end of the slot with shifting or actuating means, preferably comprising the oppositely arranged block shifting members 15. Each of these members includes a spring barrel 15ᵃ which is disposed transversely of the crosshead, and edgewise of the switching cam 5, and has at its outer end a suitable closure plug 16 which constitutes an abutment for a coil spring 17, loosely receiving at its end opposite the plug, a suitable non-friction element, such for instance as a bearing ball 18. As will be observed, more particularly from Figs. 2 and 3, these bearing balls normally engage the oppositely inclined upper cam faces 7—7 of the switching cam 5 (see Fig. 2).

It will be apparent from the foregoing description that when the switching cam 5 is moved upwardly through the slot 14 in the block 9, the balls 18 will ride on the upper inclined edges 7—7 until they reach the tips of the opposite cam points 6—6. Then, as the tips of the said cam points pass these balls, the switch block 9 is sharply snapped by the pressure of the springs 17 from its normal open-circuit position, as shown in Figs. 1 and 2 to its lower closed-circuit position, as shown in Fig. 3.

Accordingly, it will be apparent that when the switch operating arm 3, carrying the switching cam 5, is actuated by the movement of the control stem A, so as to move from its normal position as shown from Figs. 1 and 2, to a higher position, the balls 18 which are riding against the inclined edges 7—7 of the switching cam will be pushed into the spring housing barrels 17 until the tips of the cam points 6 are reached. Thus, during the movement of the cam from its normal position to a point where the tips of the cam point 6 directly registers with the center of the balls 18, the switch block 9 remains in its normal position. However, as soon as the tips of the cam points pass to the opposite side of the center of the balls 18, the switch block will be thrust downwardly, by the action of the spring pressed balls riding on the inclined edges 8 of the cam. Therefore, it will be clear that the switch block 9 is snapped from its normal elevated position to a lower position for the purpose of closing the electric circuit.

In connection with this feature of the invention, it will be apparent more particularly from Fig. 5 that the opposite ends of the switch block or cross head 9 are provided with the horizontally disposed attaching members 19, that carry therewith the metallic circuit closing strips 20 which are suitably insulated from the cross heads and members 19. These strips 20 are adapted to bridge the gap between the spring fingers of the oppositely located terminal contacts 21—21 and 22—22 of the line wire terminals 23—23 and 24—24, to thus close the circuit between the ends of the line wires which lead into the switching chamber through suitable openings in the switch base B from the junction fitting J of the junction box frame F. In the present instance, two line wires are shown, thus necessitating four leaders to and from the junction fitting J, and it will of course be understood that the circuit between each pair of leaders is completed through the circuit closing strips 20.

Therefore, from the foregoing, it will be apparent that the switch block 9 carrying the contact strips 20 may be readily and quickly snapped from its elevated position, as shown in Figs. 1 and 2, to a lower position, to thereby bring the said strips into contact with the spring fingers of the line wire terminals 21—21 and 22—22, and close the circuit between the pair of line wires $w$ and $w'$ connecting respectively with the terminals 23—23 and 24—24. Owing to the peculiar diamond shape and therefore the angular characteristics of the switching cam 5, the switch block 9 will be snapped from its normal open position into its closed position, and will likewise be snapped from its closed position to its open position, thus eliminating arcing or sparking incident to the opening or closing of the circuit, and at the same time quickly cutting off and on the current to the electrode box of the water purifying apparatus, which is essential to not only effect an economical consumption of current, but to insure all of the raw water passing through the apparatus being purified.

With regard to the snap action of the switch block 9, it will be clear that whether the same is to be moved either to an open or closed position, the same quick action will take place. That is to say, the switch block 9 will be quickly snapped into and out of engagement with the spring fingers of the wire terminals, owing to the fact that a movement either upward or downward does not take place until the tips of the cam point 6 pass either on one side or the other of the center of the balls 18. In other words, the switch block will remain elevated, until the instant at which the center of the balls 18 crosses the tips of the cam point 6, the only action up to this point taking place, being that of the balls 18 moving inwardly and compressing the springs 17 while riding on the oppositely inclined cam edges 7—7 of the cam 5. On the other hand, when the switch block is in its closed position, and the cam 5 is moving downward owing to the plunger returning to its normal position in the motor, the said switch block will remain in its closed position until the balls 18 are transferred from the inclined cam edges 7.

Without further description, it is thought that the many features and advantages of the present invention will be readily apparent, and it will also be understood that various changes in the form, proportion and minor details of construction may be resorted to without departing from the spirit of the invention or scope of the appended claims.

I claim:

1. An automatic electrical switch including a reciprocating switch block having a slot, oppositely located resilient block shifting members carried by said block adjacent said slot, each of said members comprising a spring barrel and a spring pressed ball, the latter projecting into said slot at the end thereof, line wire terminal contacts located in the path of movement of said switch block, and a switching cam movable in said slot between the balls of the oppositely located block shifting members.

2. An automatic electrical switch including a switch base having a central opening, guide rods carried by said base, a switch mechanism including a movable switch block slidable on said guide rods, and a switching cam working through the opening in the switch base to operate said switch block, a cover for housing said switch mechanism and having openings for receiving the ends of said guide rods, and means on the ends of said guide rods for clamping the cover to the base.

In testimony whereof I hereunto affix my signature in the presence of two witnesses.

HARRY BUXTON HARTMAN.

Witnesses:
W. S. WILEY,
J. W. WILEY.